US009670081B2

United States Patent
Lynn

(10) Patent No.: US 9,670,081 B2
(45) Date of Patent: Jun. 6, 2017

(54) METHOD AND SYSTEMS FOR CONTROLLING MICROORGANISMS AND TURBIDITY IN RETORT COOLING WATER USING AN AQUEOUS OZONE SOLUTION

(71) Applicant: Food Safety Technology, LLC, Omaha, NE (US)

(72) Inventor: Daniel W. Lynn, Omaha, NE (US)

(73) Assignee: Food Safety Technology, LLC, Omaha, NE (US)

( * ) Notice: Subject to any disclaimer, the term of this patent is extended or adjusted under 35 U.S.C. 154(b) by 476 days.

(21) Appl. No.: 14/210,750

(22) Filed: Mar. 14, 2014

(65) Prior Publication Data

US 2014/0263097 A1    Sep. 18, 2014

Related U.S. Application Data

(60) Provisional application No. 61/788,097, filed on Mar. 15, 2013.

(51) Int. Cl.
*A23B 4/005* (2006.01)
*A23L 3/10* (2006.01)
(Continued)

(52) U.S. Cl.
CPC .............. *C02F 1/78* (2013.01); *A23B 4/005* (2013.01); *A23B 4/0056* (2013.01); *A23L 3/10* (2013.01);
(Continued)

(58) Field of Classification Search
CPC ......... A23B 4/005; A23B 4/0056; A23B 7/06; A23B 7/005; A23L 3/10; A23L 3/12; A23L 3/14; C02F 1/5236; C02F 1/78; C02F 2103/023; C02F 2103/32; C02F 2209/04; C02F 2303/04
See application file for complete search history.

(56) References Cited

U.S. PATENT DOCUMENTS 3,983,259 A * 9/1976 Maior ....................... A23B 7/06
                                                          210/774
4,490,401 A   12/1984 Becker et al.
(Continued)

FOREIGN PATENT DOCUMENTS

WO    WO 2011159541 A1 * 12/2011 .............. A61L 2/183

OTHER PUBLICATIONS

Crouzet et al. "Recowater Project: Retort Water Recycling" Eco-Innovation, Jul. 2013.*
(Continued)

*Primary Examiner* — Lucas Stelling
(74) *Attorney, Agent, or Firm* — Polsinelli PC

(57) ABSTRACT

Methods and systems for treating cooling water of a retort are described. The methods and systems generate an aqueous ozone solution and combine the aqueous ozone solution with the cooling water. The methods and systems provide a safe, economical, easy to handle, and environmentally friendly solution for maintaining a retort cooling water system. The systems and methods herein remove contaminates from the cooling water, supply a continuous sanitizer created on-site, reduce the need for additional chemicals, and reduce the labor costs attributed to maintaining the retort cooling water system.

21 Claims, 7 Drawing Sheets

(51) Int. Cl.
*C02F 1/52* (2006.01)
*C02F 1/78* (2006.01)
C02F 103/02 (2006.01)
C02F 103/32 (2006.01)

(52) U.S. Cl.
CPC ...... *C02F 1/5236* (2013.01); *C02F 2103/023* (2013.01); *C02F 2103/32* (2013.01); *C02F 2209/04* (2013.01); *C02F 2303/04* (2013.01)

(56) References Cited

U.S. PATENT DOCUMENTS

| | | |
|---|---|---|
| 2005/0211643 A1* | 9/2005 | Phillips .............. A22C 21/0061 210/753 |
| 2011/0159541 A1 | 6/2011 | Collingwood et al. |
| 2011/0220587 A1 | 9/2011 | Duve |

OTHER PUBLICATIONS

PCT/US2014/027509 International Search Report and Written Opinion mailed Jul. 21, 2014 (16 pages).

* cited by examiner

METHOD AND SYSTEMS FOR CONTROLLING MICROORGANISMS AND TURBIDITY IN RETORT COOLING WATER USING AN AQUEOUS OZONE SOLUTION

RELATED APPLICATIONS

This application claims the benefit of U.S. Provisional Patent Application No. 61/788,097, filed Mar. 15, 2013, which is hereby incorporated by reference in its entirety.

FIELD OF INVENTION

The present invention relates to methods and systems for controlling microorganisms and turbidity in retort cooling water using an aqueous ozone solution.

BACKGROUND

Retort canning operations are engineered in many fashions, including still, batch, continuous, vertical, and horizontal designs. The retort canning operations all perform the same function, namely to thermally cook a canned product to a temperature suitable for sterilization.

An important aspect of almost all retort canning operations is the use of a cooling stage or process that cools the water that has seen used in the retort to cool the cans. During the cooling, the water may become fouled from ruptured cans or spilled foods. During the cooling, the water is also heated by the cans. During the cooling process, the seams of the can are very fragile, and the cans must be handled very carefully. The water used during the cooling stage must have a sanitizer to disinfect it in case the water is sucked into the can during the cooling stage. As such, choosing the right product for sanitizing is an important decision.

Traditionally, chlorine is the sanitizing product of choice for use during the cooling stage. However, chlorine has many substantial drawbacks. The use of chloride does not eliminate the need to use and maintain supplies of degreasers, dispersants or flocculants, and rust inhibitors. This is a very complex matrix of chemicals to manage in a cooling system. These chemicals are also very expensive, unsafe to handle, and require proper management of buying, ordering, and storage. These chemicals also require constant monitoring by trained personnel. Due to employee turnover, training must be constantly implemented to train new employees. Further, meters and testing equipment must be recalibrated and maintained. The maintenance of a typical retort cooling water system may cost hundreds of thousands of dollars annually in chemicals and labor.

SUMMARY

Described herein are methods and systems for using an aqueous ozone solution in retort cooling water systems. The methods and systems generate an aqueous ozone solution and combine or mix the aqueous ozone solution with the cooling water. The methods and systems provide a safe, economical, easy to handle, and environmentally friendly solution for maintaining a retort cooling water system. The systems and methods herein remove contaminates from the cooling water, supply a continuous sanitizer created on-site, reduce the need for additional chemicals, and reduce the labor costs attributed to maintaining the retort cooling water system.

The use of the aqueous ozone solution in a retort operation serves many functions. The aqueous ozone solution keeps the water in excellent condition. The aqueous ozone solution flocculates solids for removal. The aqueous ozone solution provides for biological control of contaminates in the water. The aqueous ozone solution reduces spoilage of food products in the by providing the biological control of the contaminants in the water.

In one aspect, a method for maintaining retort cooling water is described. The method includes forming an aqueous ozone solution and directing the aqueous ozone solution to a cooling water holding tank. The cooling water holding tank contains an amount of cooling water. The method includes combining the aqueous ozone solution with the cooling water in the cooling water holding tank.

In another aspect, a method for maintaining retort cooling water is described. The method includes forming an aqueous ozone solution. The method further includes directing the aqueous ozone solution to a retort cooling water system containing cooling water. The method further includes combining the aqueous ozone solution into the cooling water. The method further includes circulating the cooling water through the retort cooling water system. The method further includes overflowing a holding tank of the retort cooling water system. The method further includes draining a portion of the cooling water from the holding tank to remove flocculates, contaminants, minerals, soaps, etc.

In another aspect, a method of maintaining a cooling a retort system is described. The method includes forming an aqueous ozone solution. The method further includes directing the aqueous ozone solution to a cold water holding tank, the cold water holding tank containing an amount of cold water. The method further includes mixing the cold water with the aqueous ozone solution to form ozonated cold water. The method further includes directing the ozonated cold water to a retort system. The method further includes cooling cans with the ozonated cold water in the retort system, whereby the ozonated cold water is heated. The method further includes directing the heated ozonated water to a hot water holding tank. The method further includes directing the heated ozonated water from the hot water holding tank to a cooling tower for cooling. The method further includes cooling the heated ozonated water. The method further includes directing the cooled ozonated water to the cold water holding tank. The method further includes draining a portion of the cooled ozonated water from the cold water holding tank.

In another aspect a retort cooling water system is described. The system includes a cold water holding tank. The cold water holding tank includes a weir fluidically engaged to a drain. A hot water holding tank is fluidically engaged to a retort. The system includes a cooling tower fluidically connected to the hot water holding tank via a cooling tower supply line. The system includes a cooling tower return line that fluidically connects the cooling tower to the cold water holding tank. An aqueous ozone solution generator supplies aqueous ozone solution to the cold water holding tank.

In another aspect a retort cooling water system is described. The system includes a cold water holding tank, which includes a weir fluidically connecting to a drain. A hot water holding tank fluidically connects to the cold water holding tank via a valve or opening between the cold water holding tank and the hot water holding tank. The system includes a retort. A retort supply line fluidically connects the retort and the cold water holding tank. A hot water tank return line fluidically connects the retort and the hot water holding tank. The system includes a cooling tower. A cooling tower supply line fluidically connects the hot water holding tank and the cooling tower. A cooling tower return line fludically connects the cooling tower and the cold water holding tank. An aqueous ozone solution generator is fluidically engaged to the system to provide the system with aqueous ozone solution.

In another aspect, a retort cooling water system is described. The system includes a cold water holding tank and a hot water holding tank. The system includes a cooling tower supply line fluidly connecting the hot water holding tank and the cooling tower. The system includes a cooling tower return line fluidly connecting the cold water holding tank and the cooling tower. The system includes an aqueous ozone solution generator, wherein the aqueous ozone solution generator supplies aqueous ozone solution to the cold water holding tank.

DETAILED DESCRIPTION OF INVENTION

Described herein are methods and systems for using ozone in retort cooling water system. The methods and systems generate an aqueous ozone solution and mix the aqueous ozone solution with the cooling water.

Figure 1:
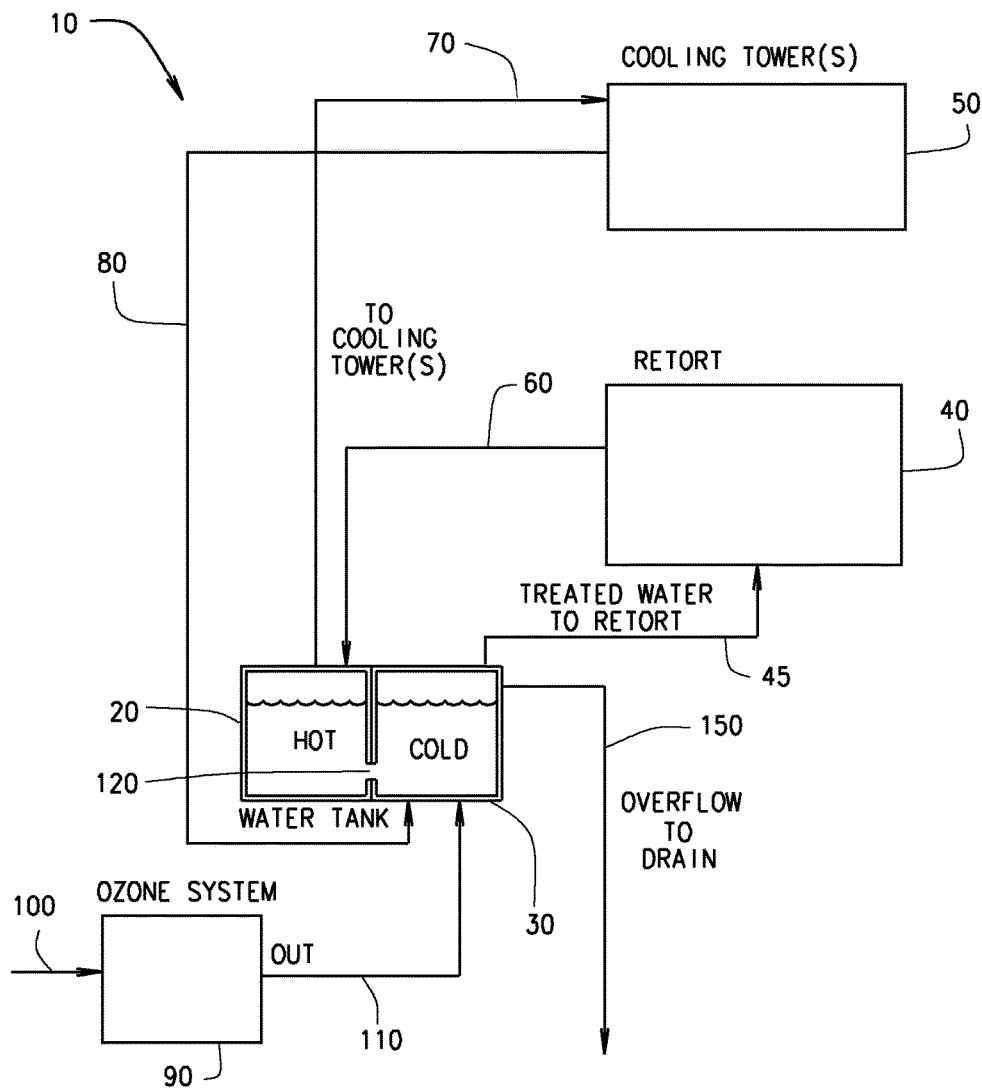
FIG. 1 is a plan view of the retort water cooling system with the aqueous ozone solution generator supplying the cold water tank.

With reference to FIG. 1, a retort water cooling system 10 is shown. The retort cooling water system 10 includes a hot water holding tank 20 and a cold water holding tank 30. Cold water from the cold water holding tank 30 is directed to a retort 40 via a retort supply line 45 in order to be sprayed on or circulated about cans or other vessels in the retort 40 that have been heated for sterilization. The cold water cools the heated cans or heated vessels in the retort 40. During the cooling process, the cold water is heated to hot water from the transfer of heat from the retort 40. The hot water is drawn from the retort 40 via a hot water tank return line 60 and directed to the hot water holding tank 20. The hot water may be contaminated or fouled from ruptured cans or from other food products on the exterior of the cans.

The hot water holding tank 20 is in fluidic communication with one or more cooling towers 50 via a cooling tower supply line 70. The hot water is directed to the cooling towers 50 via the cooling tower supply line 70. At the cooling towers 50, the hot water is cooled. The hot water may pick up contaminates or other particulate during the cooling process. The cooling towers 50 are in fluidic communication with the cold water holding tank 30 via a cooling tower return line 80. The cooling tower return line 80 supplies the cold water holding tank 30 with the cooled water from the cooling tower 50, which is again returned to the retort 40 as part of continuous cycle or process.

An ozone generator 90 supplies the cold water holding tank 30 with a supply of aqueous ozone solution. The aqueous ozone solution is mixed or combined with the cold water already present in the cold water holding tank 30. In other aspects, the aqueous ozone solution is directed to other parts of the system 10.

A municipal water supply is connected to the ozone generator 90 via a water supply line 100. The ozone generator 90 forms ozone gas and injects the ozone gas into the water from the municipal water supply to form the aqueous ozone solution. The ozone generator 90 supplies the cold water holding tank 30 with the aqueous ozone solution via an aqueous ozone solution supply line 110.

The ozone generator 90 may continually supply the retort cooling water system 10 with the aqueous ozone solution. A portion of the fluid from the retort cooling water system 10 is usually continually lost from steam emission, cooling processes, filtering, leaks, etc. The aqueous ozone solution may replace or be in addition to other make-up water or fluids that are supplied to the retort cooling water system 10.

The hot water holding tank 20 and the cold water holding tank 30 may be fluidly connected to maintain proper water levels in the tanks 20 and 30. The cold water holding tank 30 and the hot water holding tank 20 may be fluidly connected by a valve or other opening. For example, a gate valve 120 may provide the fluidic communication between the tanks 20 and 30. The gate valve 120 provides for an equilibrium of water levels to be maintained between the cold water holding tank 30 and the hot water holding tank 20. The fluids in the two tanks 20 and 30 may pass back and forth through the gate valve 120 to maintain an equal level between the hot water holding tank 20 and the cold water holding tank 30. The cold water holding tank 30 may also be fluidly connected to the municipal water supply to provide make-up water to the cold water holding tank 30. The municipal water supply may also be connected to other portions of the retort cooling water system 10 to provide make-up water for the system 10.

Figure 5:
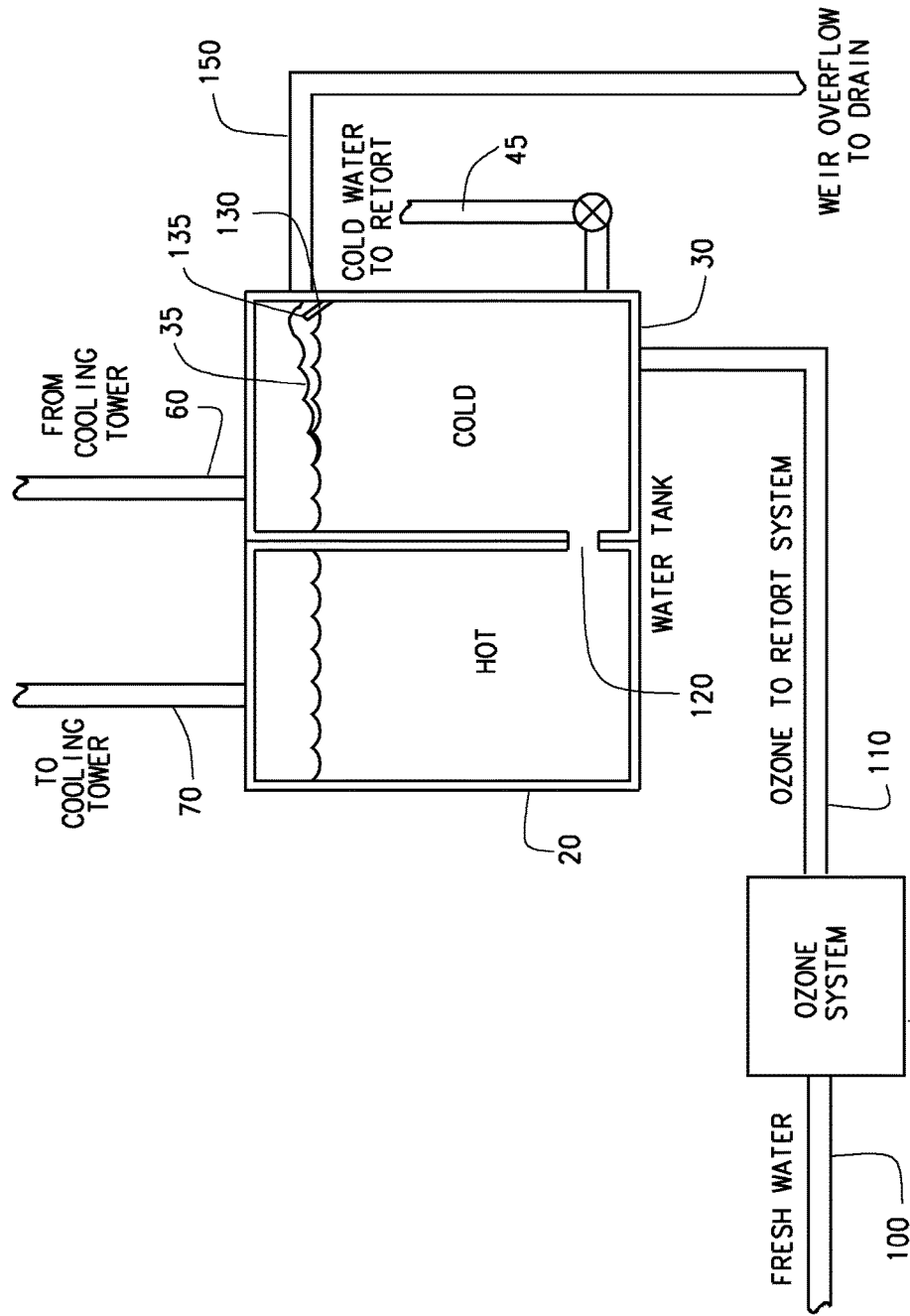
FIG. 5 is a view of the weir.

With reference to FIG. 5, a weir 130 is positioned in the cold water holding tank 30 to remove floating particulate and/or a portion of the uppermost volume of water in the cold water holding tank 30. The weir 130 may span an edge of the cold water holding tank 30. Multiple weirs 130 may also be positioned in the cold water holding tank 30. Other surface positioned drains may also be employed in the cold water holding tank 30. The weir 130 may be positioned at a level approximately equal to the desired maximum level of water in the cold water holding tank 30. The weir 130 includes an upper edge 135 proximate a surface level 35 of the water in the cold water holding tank 30. The cooling tower return line 80 supplies the cold water holding tank 30 with cold water. As additional fluid is also added to the cold water holding tank 30, the level of cold water in the cold water holding tank 30 may rise and the cold water will eventually overflow the weir 130 and drain from the cold water holding tank 30 via a drain 150. In detail, the cold water overflows the upper edge 135 of the weir 130 and then proceeds to the drain 150. The drain 150 may be in fluid communication with municipal waste water sewers.

The additional fluid to overflow the cold water holding tank 20 may be provided from the ozone generator 90, which is adding the aqueous ozone solution to the cold water holding tank 30. The additional fluid to overflow the weir 130 may also be provided from municipal make-up water added directly to the cold water holding tank 30. The additional fluid may also be provided from other ozone generators 90, which are adding the aqueous ozone solution to other portions of the system 10.

The overflowing of the weir 130 provides significant benefits. For example, fats, grease, and oils leaked from the cans in the retort 40 are saponified into soaps by the oxidizing nature of the aqueous ozone solution. The soaps may rise in the water column of the cold water holding tank 30 to the surface 35 of the water in the cold water holding tank 30 where it may be removed by the weir 130. Other particulate, contaminants, minerals, flocculate, etc. may also collect on or near the surface of the cold water in the cold water holding tank 30. The soaps, particulate, contaminants, minerals, flocculate, etc. may all overflow the weir 130 and be removed from the retort cooling water system 10. The weir 130 drains off the top volume from the cold water holding tank 30 to remove flocculates, contaminants, minerals, soaps, etc. that have floated to the top of the water level. The overflow into the weir 130 may be caused by the input of ozone solution and/or make-up water added to the system. In other aspects, the weir 130 or additional weirs 130 are integrated into the hot water holding tank 20 to remove contaminants, minerals, flocculate, etc. from the hot water holding tank 20. The ozone generator 90 may also supply the hot water holding tank 20 with the aqueous ozone solution.

The methods herein include adding additional fluid to the retort cooling water system 10 such that water is constantly, near constantly, or routinely overflowing the weir 130. In other methods, the weir 130 may also be intermittently overflowed. The overflowing of the weir 130 may also be timed with operation of the retort 40. The overflowing of the weir 130 may be timed with a cleaning cycle for the retort cooling water system 10.

Figure 6:
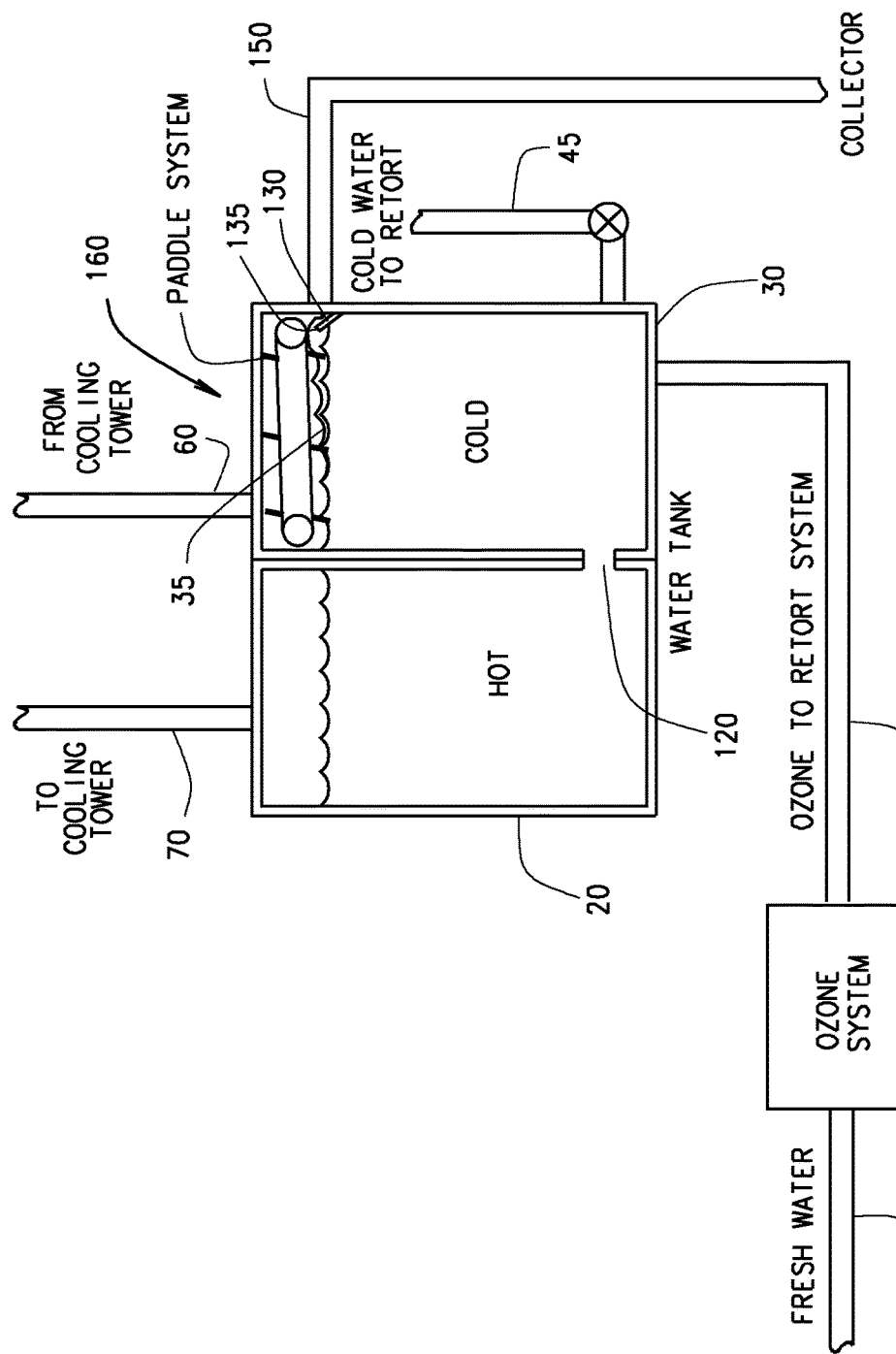
FIG. 6 is a view of the weir with the paddle system.

With reference to FIG. 6, a paddle system 160 is engaged to the cold water holding tank 30. The paddle system 160 urges the water and particulate matter to the weir 130 and to eventually overflow the weir 130. Other types of mechanical skimmers may be used to urge particulate, soaps, minerals, flocculate, and other contaminants to the weir 130. Agitators, hydraulic pumps, or other devices may be used to circulate the cold water or move the cold water towards to the weir 130.

Figure 7:
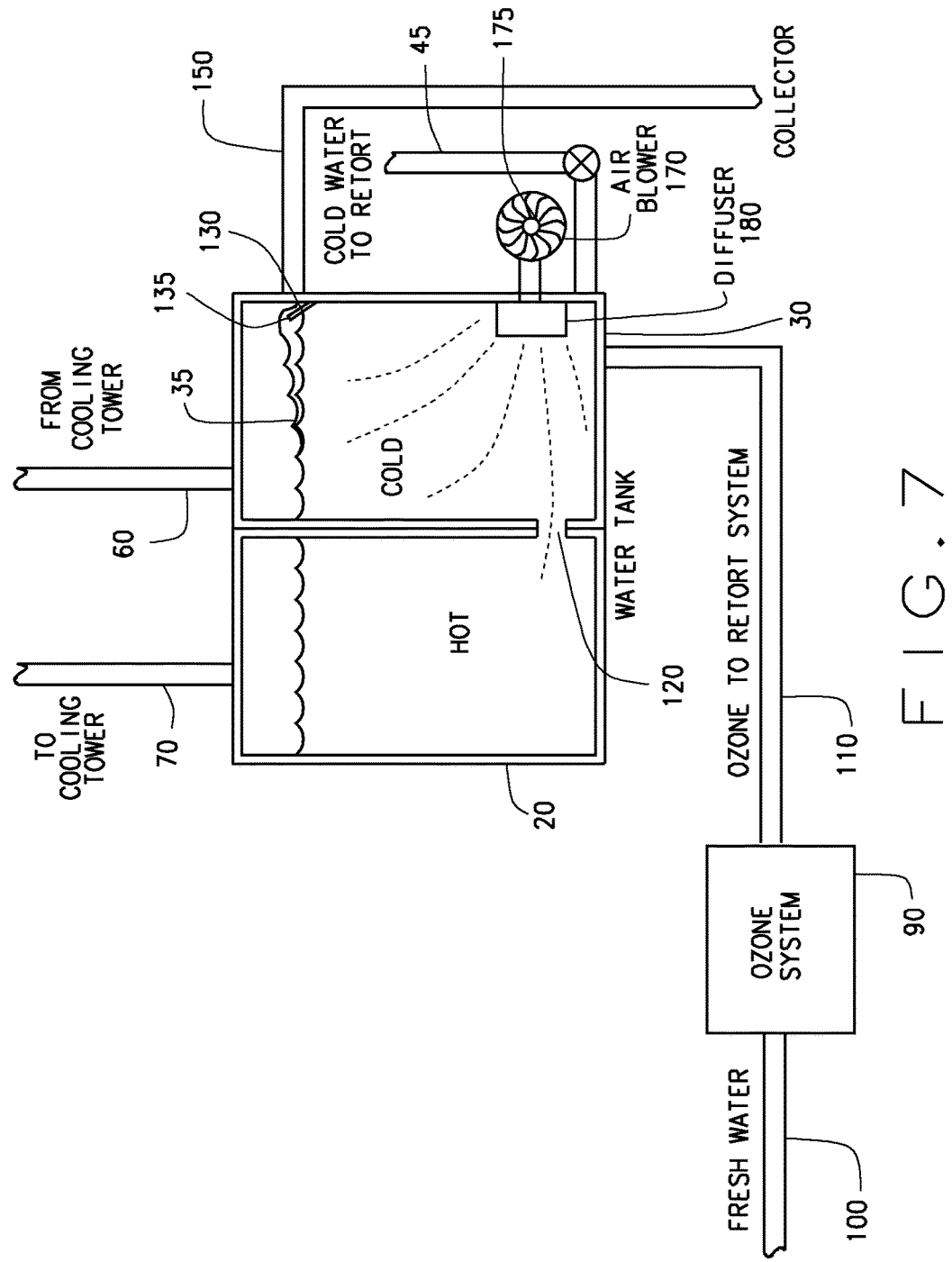
FIG. 7 is a view of the weir with the blower system.

With reference to FIG. 7, a blower system 170 is engaged to the cold water holding tank 30. A blower 175 may be positioned near a bottom of the cold water holding tank 30. The blower 175 circulates the water in the cold water holding tank 30 to move the particulate, soaps, flocculate, and other contaminants towards the weir 130. The blower 175 may include a diffuser 180 to assist in directing the water. The blower 175 may also be engaged to other nozzles, hoses, and other valves to emit air throughout the cold water holding tank 30. Other types of bubblers may be used to circulate the cold water or move the water towards to the weir 130.

As described above, the aqueous ozone solution may be generated and directed to the cold water holding tank 30 to cause the cold water to overflow the weir 130 on a near constant basis to provide continual flushing and cleaning of the retort cooling water system 10. As described below, the aqueous ozone solution may also be generated and provided to the retort cooling water system 10 in several fashions.

Figure 2:
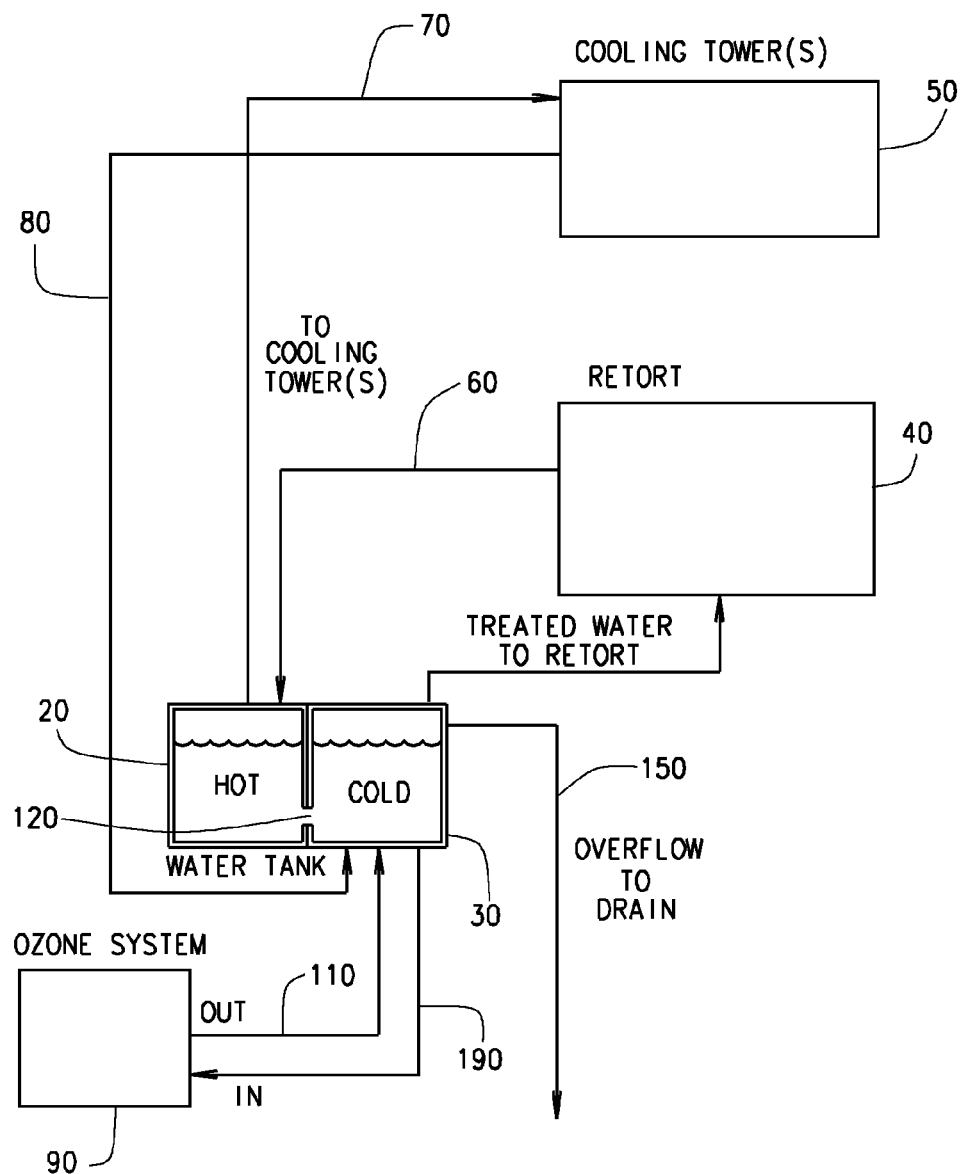
FIG. 2 is a plan view of the retort water cooling system with the aqueous ozone solution generator drawing water from the cold water tank to form the aqueous ozone solution.

With reference to FIG. 2, the ozone generator 90 draws water from the cold water holding tank 20 via a supply line 190. In this aspect, the aqueous ozone solution is formed from the water from the cold water holding tank 30 and then returns the aqueous ozone solution to the cold water holding tank 30.

Figure 3:
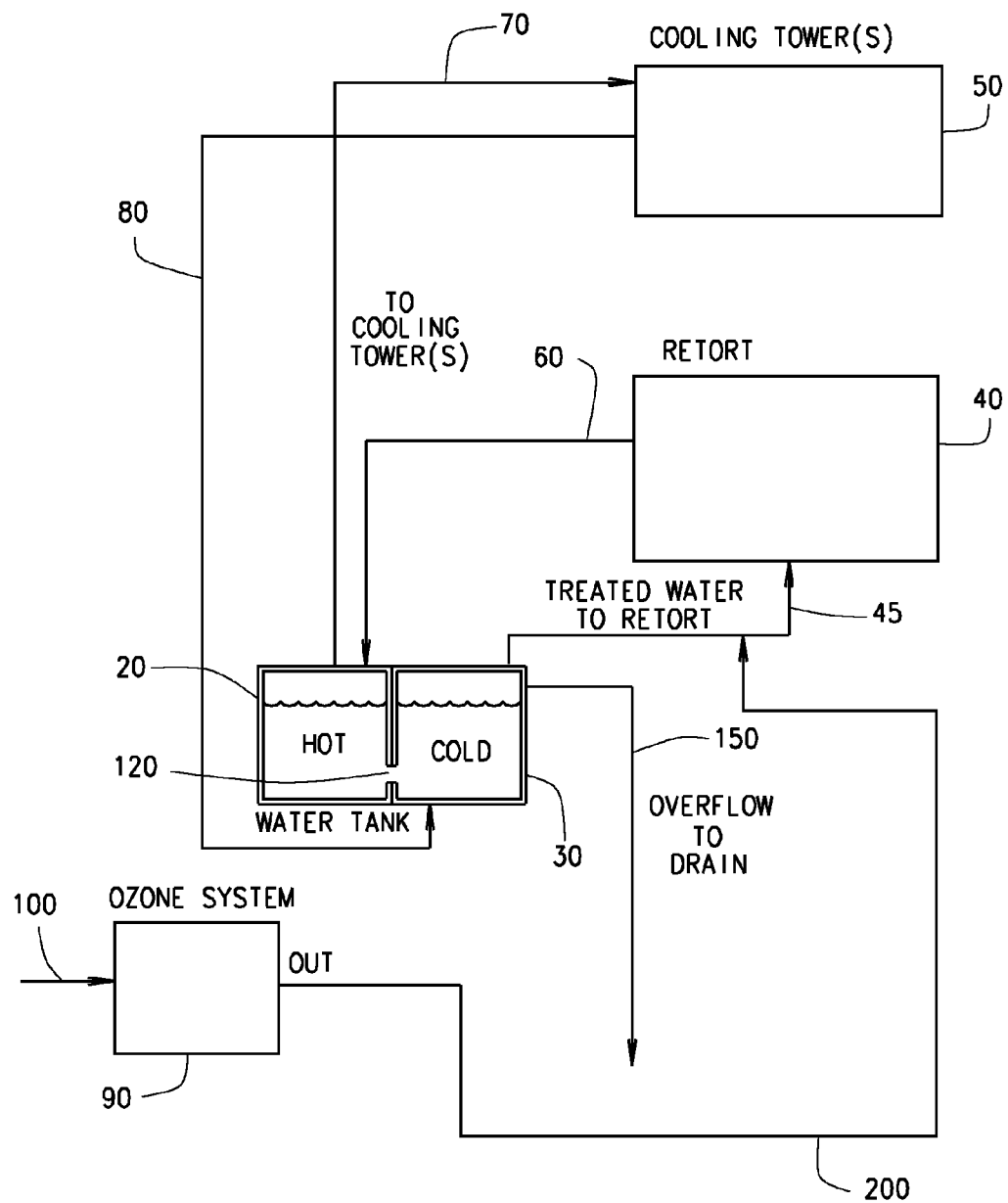
FIG. 3 is a plan view of the retort water cooling system with the aqueous ozone solution generator supplying the retort.

With reference to FIG. 3, the ozone generator 90 supplies the aqueous ozone solution to the retort 40 via an aqueous ozone solution supply line 200. In this aspect, the ozone generator 90 is directly supplying the retort supply line 45 with the aqueous ozone solution.

Figure 4:
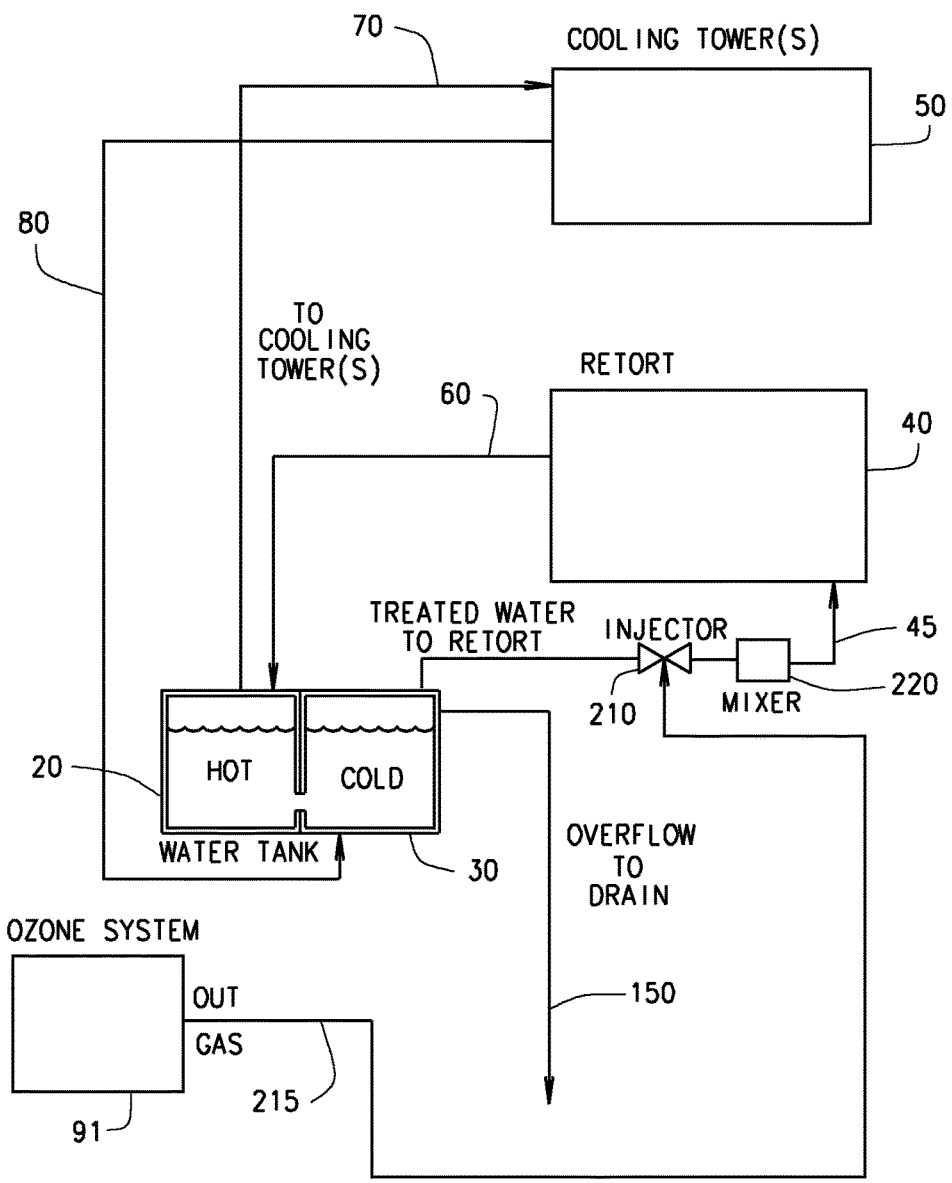
FIG. 4 is a plan view of the retort water cooling system with the ozone generator 90 supplying the retort supply line with ozone gas.

With reference to FIG. 4, an ozone generator 91 supplies ozone gas to an injector 210 positioned in the retort supply line 45. A mixer 220 may also be positioned in the retort supply line 45 after the injector 210. Thus, the injector 210 injects the ozone gas into fluid in the retort supply line 45, and the mixer 220 further mixes the aqueous ozone solution.

The injector 210 injects the ozone gas into the fluid from the injector line 160. The injector 210 may include a mazzei injector or other type of venturi to mix the ozone gas with the water. Any of a variety of injectors could be utilized. The injector 210 creates a vacuum to draw the ozone gas from the ozone generator 91 and then dissolves the ozone in the fluid from the retort supply line 45.

The mixer 220 further processes the fluid to reduce the bubble size of the ozone gas in the fluid. The mixer 220 further reduces the number of ozone gas bubbles in the ozonated fluid to increase the concentration of ozone in the ozonated fluid. Breaking down the bubbles of ozone into smaller bubbles of ozone increases the oxidation reduction potential of the ozone in the fluid.

Although a single ozone generator 90 is shown in the FIGS., additional ozone generators 90 may be placed about or engaged to the retort cooling water system 10 to provide aqueous ozone solution to the cooling tower 50, the retort 40, the cold water holding tank 30, and/or the hot water tank 20.

A filtering system may also be employed with the retort cooling water system 10. The filtering system may be in fluidic communication with the hot water holding tank 20. The filtering system draws hot water from the hot water holding tank 20 and filters the hot water. The filtering system may remove particulate matter from the hot water in the hot water holding tank 20. The filtering system removes the hot water from the hot water holding tank 20, filters, the hot water, and returns the hot water to the hot water holding tank 20. A similar filtering system may also be employed in the cold water holding tank 30.

The methods and systems may use an aqueous ozone solution generators commercially available from Food Safety Technology, LLC of Omaha, Nebr. Such aqueous ozone solution generators are described in U.S. Patent Publications Nos. 2009/0120473, 2011/0030730, 2013/0142704, and 2013/0195725, which are hereby incorporated by reference in their entirety. Generally, such ozone generators produce ozone gas and then inject the ozone gas into water to form the aqueous ozone solution.

The ozone generator 90 generates a supply of the aqueous ozone solution. A municipal water supply may supply the ozone generator 90 with water to be ozonated. After formation, the aqueous ozone solution is directed to the cold water holding tank 30 via the aqueous ozone solution supply line 110 and mixed or combined with the cold water therein. The aqueous ozone solution is circulated throughout the retort cooling water system 10. The aqueous ozone solution is circulated to the retort 40 and sprayed directly on the cans or circulated about the cans. In detail, the aqueous ozone solution is circulated through the cold water holding tank 20, through the retort supply line 45, through the retort 40, through the hot water tank return line 60, thorough the hot water holding tank 30, through the cooling tower supply line 70, through the cooling tower 50, through the cooling tower return line 80, and back to the cold water holding tank 20.

The aqueous ozone solution cleans and sanitizes of all of these components. Importantly, the cold water holding tank 20 is maintained by the aqueous ozone solution, and the particulate, soaps, flocculate, and other contaminants towards are removed from the system 10 by the weir 130 to substantially improve turbidity levels of the water.

ORP sensors and monitors may be integrated into the retort cooling water system 10 to monitor and measure ORP levels of the aqueous ozone solution. Depending on ORP readings, the ozone generator 90 may modulate the concentration or volume of the aqueous ozone solution provided to the cold water holding tank 30 or other part of the system 10. The ozone generator 90 may regulate the ORP of the water in the system to maintain an ORP of approximately 250-450 millivolts.

The methods and system provide microbial control for the retort cooling water. The FDA mandates the microbial control of cooling water. The FDA mandates that cooling water shall be chlorinated or otherwise sanitized as necessary for cooling canals and for re-circulated water supplies, and that there shall be a measurable residual of the sanitizer employed at the water discharge point of the container cooler. The aqueous ozone solution formed from the ozone generator 90 satisfies these requirements.

The use of an aqueous ozone solution helps manage the sanitizer level of the cooling water. The aqueous ozone solution maintains constant levels of sanitizer in the solution even with blown, buckled, or dirty cans in the retort. The system 10 maintains a level of 100 CFU per ml or less for the cooling water.

The use of aqueous ozone solution also provides additional advantages by improving the appearance of the cans processed by the retort 40. The aqueous ozone solution has the ability to oxidize iron and manganese very rapidly to form a black flocculate that settles out of the water. The black flocculate accumulates on the bottom of the tanks 20 or 30. This helps reduce the water spots on cans.

The use of aqueous ozone solution provides additional advantages by saving money spent on chemicals. The use of the aqueous ozone solution may replace or reduce the use of biocides, rust inhibitors, and dispersants in the typical retort water cooling system. The maintenance of the typical retort cooling water system may cost hundreds of thousands of dollars annually in chemicals and labor.

Moreover, the use of conventional chemicals is often counter-productive. This dilemma is caused by the fact that the three chemicals (biocides, rust inhibitors, and dispersants) often work against each other and create additional problems. The biocide will cause rust, so corrosion inhibitors are added. The corrosion inhibitors conglomerate to particles in the water, so dispersants are added, and the matrix continues. The use of aqueous ozone solution prevents or reduces this cascade of chemical use. The use of the methods and systems using the aqueous ozone solution may provide a significant financial and labor savings. The use of the methods and systems using the aqueous ozone solution may replace or reduce the need for conventional chemicals and treatments typically used in cooling systems.

The use of ORP is proven as a measurement of the killing power of a sanitizer in water. ORP stands for oxidation reduction potential. The system 10 provides an aqueous ozone solution with an ORP of approximately 250-450 millivolts. Thus, the aqueous ozone solution is a suitable oxidizer. Further, the ORP level may be raised by increasing the flow and/or concentration of the aqueous ozone solution into the system 10.

The use of aqueous ozone solution provides additional advantages by controlling rust on cans. During the seaming of the cans, the machinery will often scuff or scrape the can, which exposes the metal to water, which causes rust. The presence of rust on a can is undesirable to consumers, resulting in product rejection, and ultimately costs the company money and goodwill because of the rejected product. The science of using an aqueous ozone solution in the retort process changes the rust formulation of the metal from red (hematite) rust to black (magnetite) rust. Magnetite rust is generally acceptable to consumers and such cans will typically be purchased with minimal issues.

The formulas for typical iron oxides are described below:

| Formula | Color | Oxidation State | MP | Structure/comments |
|---------|-------|-----------------|------|--------------------|
| $Fe_2O_3$ | red brown | $Fe^{3+}$ | 1560d | α-form Hematite, β-form used in cassettes |
| $Fe_3O_4$ | black | $Fe^{2+/3+}$ | 1538d | magnetite/lodestone |
| FeO | black | $Fe^{2+}$ | 1380 | pyrophoric |

The commonly referred to "rust" is the flaky red-brown solid, which is largely hydrated iron. The primary corrosion product of iron is Fe (OH) 2 (or more likely $FeO.nH_2O$), but the action of oxygen and water can yield other products having different colors:

1. $Fe_2O_3.H_2O$ (hydrous ferrous oxide, sometimes written as Fe $(OH)_3$) is the principal component of red-brown rust. It can form a mineral called hematite.
2. $Fe_3O_4.H_2O$ ("hydrated magnetite" or ferrous ferrite, $Fe_2O_3.FeO$) is most often green but can be deep blue in the presence of organic compounds.
3. $Fe_3O_4$ ("magnetite") is black The use of aqueous ozone solution in the retort eliminates or reduces the need for a plant to use a rust inhibitor in the retort water, which saves large amounts of money because of the above chemical processes. The aqueous ozone solution oxidizes to the "magnetite" level with iron, which is more acceptable then the red or "hematite" rust on cans.

The aqueous ozone solution also provides biological control of the retort cooling tower. This is important because the cooling tower is used to remove the heat from the water, which removes the heat from the cans. The use of the methods herein reduces the buildup of scale and/or organic films on the cooling tower. This results in cost savings for the company.

The aqueous ozone solution also provides a degreaser and organic remover. The aqueous ozone solutions have the ability to react with the grease and the fats in the hot water from the retort to form the soaps, which may be removed by the weir 130 to maintain water quality in the retort cooling water system 10. The use of the method and systems herein reduce turbidity in the system 10. The soaps, particulate, minerals, and other contaminants may pass over the weir 130 and be removed from the retort cooling water system 10. The use of the weir 130 assists in removing the contaminated products and helps to keep the water clean and reduces turbidity.

The ozone generator 90 may provide an aqueous ozone solution to the system 10 at a flow rate of up to approximately 50 GPM with an ORP of up to 10 PPM. In certain applications, a flow rate of 16 GPM with an ORP of approximately 6-8 PPM provides satisfactory cleaning and microorganism control for the system 10. This flow and concentration maintains a standard ORP level which gives low CFU counts in the water to help prevent spoilage of cans. The flow rates and ORP from the ozone generator 90 may be adjusted as needed.

The aqueous ozone solution also helps keep the filter system clean by floating the solids out of the water and away from the system and to the drain. The methods and systems reduce the frequency of the filter handling and tank cleaning labor. The safety factor of not having to get into the tanks to clean is a benefit to plant safety managers. The use of the methods and system herein drastically reduce plant down time caused by cleaning the cold and hot water holding tanks. Further, sewer lines connected to the system 10 require less cleaning.

What is claimed is:

1. A method for maintaining retort cooling water, comprising:
    forming an aqueous ozone solution;
    directing the aqueous ozone solution to a retort cooling water system containing cooling water;
    combining the aqueous ozone solution into the cooling water;
    circulating the cooling water through the retort cooling water system;
    overflowing a holding tank of the retort cooling water system; and,
    draining a portion of the cooling water from the holding tank.

2. The method according to claim 1, further comprising directing the aqueous ozone solution to a cold water holding tank of the retort cooling water system, the cold water holding tank containing an amount of the cooling water, and mixing the aqueous ozone solution with the cooling water in the cooling water holding tank.

3. The method according to claim 1, further comprising directing the aqueous ozone solution to a cold water holding tank of the retort cooling water system, the cold water holding tank containing an amount of the cooling water, combining the aqueous ozone solution into the cooling water, overflowing the cold water holding tank, and draining a portion of the cooling water from the cold water holding tank.

4. The method according to claim 1, further comprising maintaining a coliform count of the cooling water to less than 100 coliform units.

5. The method according to claim 1, further comprising directing the aqueous ozone solution to a cold water holding tank of the retort cooling water system, the cold water holding tank containing an amount of the cooling water, combining the aqueous ozone solution with the cooling water in the cooling water holding tank, directing the mixture of the aqueous ozone solution and the cooling water to a retort, and spraying or applying the mixture on to cans in the retort.

6. The method according to claim 1, further comprising directing the aqueous ozone solution to a cold water holding tank of the retort cooling water system, the cold water holding tank containing an amount of the cooling water, providing a weir in the cold water holding tank, overflowing the weir in the cold water holding tank, and draining a portion of the cooling water from the cold water holding tank to remove flocculates, contaminants, minerals, soaps, or combinations thereof.

7. The method according to claim 1, further comprising circulating the aqueous ozone solution through the cold water holding tank, through a retort supply line, through a retort, through a hot water tank return line, thorough a hot water holding tank, through a cooling tower supply line, through a cooling tower, through a cooling tower return line, and back to the cold water holding tank.

8. The method according to claim 1, further comprising positioning the weir to set an approximate maximum level of fluid in the cold water holding tank, and engaging the weir to a drain.

9. A method of maintaining a cooling a retort system, comprising:
    forming an aqueous ozone solution;
    directing the aqueous ozone solution to a cold water holding tank, the cold water holding tank containing an amount of cold water;
    mixing the cold water with the aqueous ozone solution to form ozonated cold water;
    directing the ozonated cold water to a retort system;
    cooling cans with the ozonated cold water in the retort system, whereby the ozonated cold water is heated;
    directing the heated ozonated water to a hot water holding tank;
    directing the heated ozonated water from the hot water holding tank to a cooling tower for cooling;
    cooling the heated ozonated water;
    directing the cooled ozonated water to the cold water holding tank; and,
    draining a portion of the cooled ozonated water from the cold water holding tank.

10. A retort cooling water system, comprising:
    a cold water holding tank, comprising a weir fluidically engaged to a drain;
    a hot water holding tank fluidically connecting to a retort;
    a cooling tower;
    a cooling tower supply line fluidically connecting the hot water holding tank and the cooling tower;
    a cooling tower return line fluidically connecting the cooling tower to the cold water holding tank;
    an aqueous ozone solution generator; and,
    wherein the aqueous ozone solution generator supplies aqueous ozone solution to the cold water holding tank.

11. The retort cooling water system according to claim 10, wherein the system is engaged to a retort that sterilizes cans.

12. The retort cooling water system according to claim 10, wherein the system comprises an aqueous ozone solution supply line fluidly connecting the aqueous ozone generator and the cold water tank.

13. The retort cooling water system according to claim 10, wherein the ozone generator regulates an ORP of water in the system to maintain an ORP of approximately 250-450 millivolt.

14. The retort cooling water system according to claim 10, wherein the ozone generator regulates an ORP of water in the system to maintain an ORP of approximately 250-350 millivolt.

15. The retort cooling water system according to claim 10, further comprising a blower system engaged to the cold water holding tank to direct water toward to the weir.

16. The retort cooling water system according to claim 10, further comprising a paddle system in the cold water holding tank to direct water toward to the weir.

17. The retort cooling water system according to claim 10, wherein the aqueous ozone solution generator supplies aqueous ozone solution directly to the retort or to a retort supply line.

18. The retort cooling water system according to claim 10, wherein the weir is positioned at an upper portion of the cold water holding tank.

19. The retort cooling water system according to claim 10, wherein the weir sets an approximate upper level for fluid in the cold water holding tank.

20. The retort cooling water system according to claim 10, wherein the weir drains an overflow of fluid from the cold water holding tank.

21. A retort cooling water system, comprising:
- a cold water holding tank, comprising a weir fluidically connecting to a drain;
- a hot water holding tank fluidically connecting to the cold water holding tank via a valve or opening between the cold water holding tank and the hot water holding tank;
- a retort;
- a retort supply line fluidically connecting the retort and the cold water holding tank;
- a hot water tank return line fluidically connecting the retort and the hot water holding tank;
- a cooling tower;
- a cooling tower supply line fluidically connecting the hot water holding tank and the cooling tower;
- a cooling tower return line fludically connecting the cooling tower and the cold water holding tank; and,
- an aqueous ozone solution generator fludically engaged to the system to provide the system with aqueous ozone solution.

* * * * *